United States Patent
Molloy et al.

(10) Patent No.: US 12,531,751 B2
(45) Date of Patent: Jan. 20, 2026

(54) MULTISIGNATURE TRANSACTIONS

(71) Applicant: nChain Licensing AG, Zug (CH)

(72) Inventors: Katharine Molloy, London (GB); Craig Steven Wright, London (GB); Owen Vaughan, London (GB)

(73) Assignee: nChain Licensing AG, Zug (CH)

( * ) Notice: Subject to any disclaimer, the term of this patent is extended or adjusted under 35 U.S.C. 154(b) by 127 days.

(21) Appl. No.: 18/268,872

(22) PCT Filed: Nov. 23, 2021

(86) PCT No.: PCT/EP2021/082664
§ 371 (c)(1),
(2) Date: Jun. 21, 2023

(87) PCT Pub. No.: WO2022/135812
PCT Pub. Date: Jun. 30, 2022

(65) Prior Publication Data
US 2024/0275611 A1    Aug. 15, 2024

(30) Foreign Application Priority Data
Dec. 23, 2020    (GB) ........................... 2020453

(51) Int. Cl.
*H04L 9/32*    (2006.01)
*H04L 9/00*    (2022.01)

(52) U.S. Cl.
CPC ............. *H04L 9/3255* (2013.01); *H04L 9/50* (2022.05)

(58) Field of Classification Search
CPC ................. H04L 9/3255; H04L 9/50
See application file for complete search history.

(56) References Cited

U.S. PATENT DOCUMENTS 5,854,932 A * 12/1998 Mariani ..................... G06F 8/48
717/145
6,430,305 B1 * 8/2002 Decker .................. G06F 18/254
382/116

(Continued)

FOREIGN PATENT DOCUMENTS

JP    2019526199 A    9/2019
WO    2020240297    12/2020

OTHER PUBLICATIONS

PCT/EP2021/082626 International Search Report and Written Opinion dated Jan. 25, 2022, 15 pages.

(Continued)

*Primary Examiner* — Abu S Sholeman
(74) *Attorney, Agent, or Firm* — Messner Reeves LLP

(57) ABSTRACT

A computer implemented method for generating a multisignature transaction for a blockchain comprising: receiving a first output and a non-signature portion of a first input, the first input comprising an outpoint to a first spendable transaction output encoding a multisignature requirement; electronically signing the first output and the non-signature portion of the first input, thereby generating a signature for satisfying the multisignature requirement when included with: (i) an associated sighash single flag, and (ii) at least one other signature; receiving a second output and a non-signature portion of a second input, the second input comprising an outpoint to a second spendable transaction output encoding a signature requirement requiring at least one signature; and electronically signing the second output and the non-signature portion of the second input, thereby generating a signature for at least partially satisfying the signature requirement when included in a signature portion with an associated sighash single flag.

20 Claims, 9 Drawing Sheets

(56) References Cited

U.S. PATENT DOCUMENTS

| | | | |
|---|---|---|---|
| 11,943,331 | B2 | 3/2024 | Bartolucci et al. |
| 12,047,443 | B2 | 7/2024 | Zhang et al. |
| 12,346,205 | B2* | 7/2025 | Zhao .................. G06F 11/1448 |
| 2006/0289775 | A1* | 12/2006 | Inbar ..................... G01V 5/281 |
| | | | 250/370.11 |
| 2012/0158729 | A1* | 6/2012 | Mital ..................... H04L 47/78 |
| | | | 707/738 |
| 2016/0267472 | A1* | 9/2016 | Lingham .............. G06Q 20/327 |
| 2017/0232300 | A1 | 8/2017 | Tran et al. |
| 2017/0330174 | A1 | 11/2017 | DeMarinis et al. |
| 2018/0350180 | A1 | 12/2018 | Onischuk |
| 2019/0116024 | A1* | 4/2019 | Wright .................. H04L 9/3066 |
| 2019/0164153 | A1 | 5/2019 | Agrawal et al. |
| 2019/0213821 | A1 | 7/2019 | Davis |
| 2019/0251270 | A1 | 8/2019 | Liu et al. |
| 2019/0268312 | A1 | 8/2019 | Ma et al. |
| 2019/0354518 | A1 | 11/2019 | Zochowski |
| 2022/0114583 | A1 | 4/2022 | Nie |
| 2022/0138748 | A1* | 5/2022 | Millar .................... G06Q 40/04 |
| | | | 705/75 |
| 2024/0013213 | A1 | 1/2024 | Trock |

OTHER PUBLICATIONS

Anonymous, "OP_CHECKSIG—Bitcoin Wiki", Jan. 16, 2019 (Jan. 16, 2019), XP055657864, Retrieved from the Internet: URL: https://en.bitcoin.it/w/index.php?title=OP_CHECKSIG&oldid=66023 [retrieved on Jan. 14, 2020].

GB2020452.5 Combined Search and Examination Report dated Aug. 27, 2021, 11 pages.

Raghav Sood., "Bitcoin's Signature Types—SIGHASH", 2018, retrieved from the internet: URL: https://raghavsood.com/blog/2018/06/10/bitcoin-signature-types-sighash, accessed Aug. 30, 2020.

Craig S Wright, "A distribution protocol for dealerless secret distribution", White Paper, nCrypt Holdings Ltd, Jul. 12, 2016, 23 pages.

Michaella Pettit, "Shared Secrets and Threshold Signatures", White Paper, nChain Holdings Ltd, 2020, 23 pages.

PCT/EP2021/082664 International Search Report and Written Opinion dated Feb. 25, 2022, 15 pages.

GB2020453.3 Combined Search Report and Abbreviated Examination Report dated Jun. 22, 2021, 8 pages.

Galbraith Steven et al: "Practical Aggregate Signature from General Elliptic Curves, and Applications to Blockchain", Proceedings of the 2019 ACM Asia Conference on Computer and Communications Security, Asia CCS '19, Jul. 2, 2019 (Jul. 2, 2019), pp. 529-538, sections 2,3,5,6; tables 1-4 New York, New York, USA, URL: https://dl.acm.org/doi/pdf/10.1145/3321705.3329826.

Ozyilmaz Kazim Rifat et al: "A Multi-protocol Payment System to Facilitate Financial Inclusion", Sep. 20, 2019 (Sep. 20, 2019), Computer Vision—ECCV 2020 : 16th European Conference, Glasgow, UK, Aug. 23-28, 2020 : Proceedings; Part of the Lecture Notes in Computer Science; Springer International PU, XP047523397, ISBN: 978-3-030-58594-5 [retrieved on Sep. 20, 2019] sections 2, 3; figure 1.

Rosenbaum K., "9.5 Various Signature Types," Bitcoins, First Edition, Mar. 23, 2020, pp. 350-351.

* cited by examiner

Transaction from Alice to Bob

Validated by running: Locking script from output 203 of $Tx_0$, together with Alice's unlocking script from input 202 of $Tx_1$. This checks that Alice's unlocking script in $Tx_1$ meets the condition(s) defined in the locking script of previous transaction $Tx_0$.

500

| TxID$_n$ | | | |
|---|---|---|---|
| Version | 1 | Locktime | 0 |
| In-count | 3 | Out-count | 4 |
| Input List | | Output List | |
| Outpoint | Unlocking Script | Value | Locking Script |
| I$_0$ Multisig 2-of-n | <Sig A$_0$ : SINGLE\|ACP> <Sig B : ALL> | x$_0$ satoshi | O$_0$ Multisig 2-of-n |
| I$_1$ | <Sig A$_1$ : SINGLE\|ACP> | x$_1$ satoshi | O$_1$ Alice's Address |
| I$_2$ | <Sig J$_B$ : SINGLE> | x$_2$ satoshi | O$_2$ J$_B$'s Address |
| | | x$_3$ satoshi | O$_3$ Bob's Address |

| TxID$_n$ | | | |
|---|---|---|---|
| Version | 1 | Locktime | 0 |
| In-count | 2 | Out-count | 3 |
| Input List | | Output List | |
| Outpoint | Unlocking Script | Value | Locking Script |
| I$_0$ Multisig 3-of-n | \<Sig A$_0$ : SINGLE\|ACP\> \<Sig B$_0$ : SINGLE\> \<Sig C : ALL\> | x$_0$ satoshi | O$_0$ Multisig 3-of-n |
| I$_1$ | \<Sig A$_1$ : SINGLE\|ACP\> | x$_1$ satoshi | O$_1$ Alice's Address |
| I$_2$ | \<Sig B$_1$ : SINGLE\> | x$_2$ satoshi | O$_2$ Bob's Address |
| | | x$_3$ satoshi | O$_3$ Charlie's Address |

Figure 9

| TxID | | | | | |
|---|---|---|---|---|---|
| Version | | | | | |
| Index | Inputs | | | Outputs | |
| | Outpoint (TxID, index) | Unlocking Script | nSeq | Value | Locking Script |
| 0 | $Outpoint_i$ | $[sig(m_i, a_i)] \, [P_i]$ | $nSeq_i$ | $v_w$ | $P2PKH(P_w)$ |
| 1 | $Outpoint_j$ | $[sig(m_j, a_j)] \, [P_j]$ | $nSeq_j$ | $v_x$ | $P2PKH(P_x)$ |
| 2 | $Outpoint_k$ | $[sig(m_k, a_k)]$ $[P_k]$ | $nSeq_k$ | $v_y$ | $P2PKH(P_y)$ |
| 3 | | | | $v_z$ | $P2PKH(P_z)$ |
| Locktime | | | | | |

Formulating message $m_k$ (input in index 2)

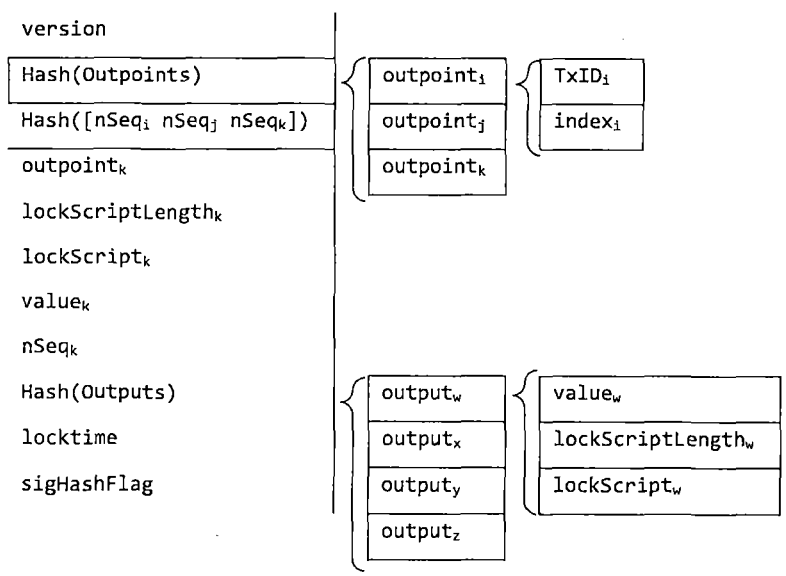

$m_k$ =[version][Hash(Outpoints)][Hash(nSeqs)][outpoint$_k$][lockScriptLength$_k$]...

[lockScript$_k$][value$_k$][nSeq$_k$][Hash(Outputs)][locktime][sigHashFlag]

MULTISIGNATURE TRANSACTIONS

CROSS REFERENCE TO RELATED APPLICATIONS

This application is the U.S. National Stage of International Application No. PCT/EP2021/082664 filed on Nov. 23, 2021, which claims the benefit of United Kingdom Patent Application No. 2020453.3, filed on Dec. 23, 2020, the contents of which are incorporated herein by reference in their entireties.

TECHNICAL FIELD

The present disclosure relates to blockchain transactions with an input which has a multisignature unlocking requirement.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

SUMMARY

In blockchain transactions, signatures serve three purposes: to provide evidence of ownership of or legitimate control over the funds being spent, to authorise the spending, and to ensure the integrity of the transaction information. The third function ensures that specific details of the transaction cannot be changed without rendering the signature invalid. For instance, signing the outputs ensures that no one can intercept the transaction once it has been broadcast to the network and modify the address to which funds are assigned.

For certain output-based transaction models, typically, when signing a transaction, the signing party creates a signature that applies to all inputs and outputs defined in the transaction. However, by using different tags (known as sighash flags) when creating a signature, it is possible to make a signature specific so that it only applies to, or 'endorses', certain elements of the transaction.

In situations where multiple parties collaborate on a single transaction, a traditional sighash ALL signing approach requires some initial communication between parties to establish the transaction details before signing can proceed. This can be inefficient, and in many cases imparts a mutual dependency that does not accurately reflect the relationship between parties. In contrast, combining different sighash flags can provide parties with the flexibility to sign different parts of the transaction independently.

Such flexibility may be required when transactions have at least one multisignature spending requirement. Multiple owners of the UTXO are required to authorise spending of said UTXO, with spent UTXO being distributed to individuals among those owners or other parties. In some instances, those required to provide a signature for the multisignature requirement do not need to also authorise the exact amounts being transferred to each party. The use of the standard sighash ALL signing model does not lend itself well to such a hierarchical spending structure because, under this model, all inputs and outputs must be known before the signatures are provided. Therefore, parties who are not required, or not authorised, to authorise transfers under a policy associated with the UTXO with the multisignature spending requirement are nonetheless required to authorise the transfers via the blockchain. This could lead to, for example, a party who under the policy is not able to deny a payment, preventing the payment by not providing their signature.

According to one aspect disclosed herein, there is provided a computer implemented method for generating a multisignature transaction for a blockchain, the method comprising: receiving a first output and a non-signature portion of a first input of a first input-output pair of the multisignature transaction, the first input comprising an outpoint to a first spendable transaction output encoding a multisignature requirement; electronically signing the first output and the non-signature portion of the first input of the first input-output pair, but not any other output of the multisignature transaction, with a private key corresponding to a public key of the multisignature requirement, thereby generating a signature for satisfying the multisignature requirement when included in a signature portion of the first input with: (i) an associated sighash single flag, and (ii) at least one other signature valid in respect of the multisignature requirement; receiving a second output and a non-signature portion of a second input of a second input-output pair of the multisignature transaction, the second input comprising an outpoint to a second spendable transaction output encoding a signature requirement requiring at least one signature; and electronically signing the second output and the non-signature portion of the second input of the second input-output pair of the multisignature transaction, but not any other output of the multisignature transaction, with a private key corresponding to a public key of the signature requirement, thereby generating a signature for at least partially satisfying the signature requirement when included in a signature portion of the second input with an associated sighash single flag.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 5 is an example multisignature transaction with two signing parties, FIG. 6 is an example multisignature transactions with three signing parties.

FIG. 9 depicts a process of message generation.

DETAILED DESCRIPTION OF EMBODIMENTS

Example System Overview

Figure 1:
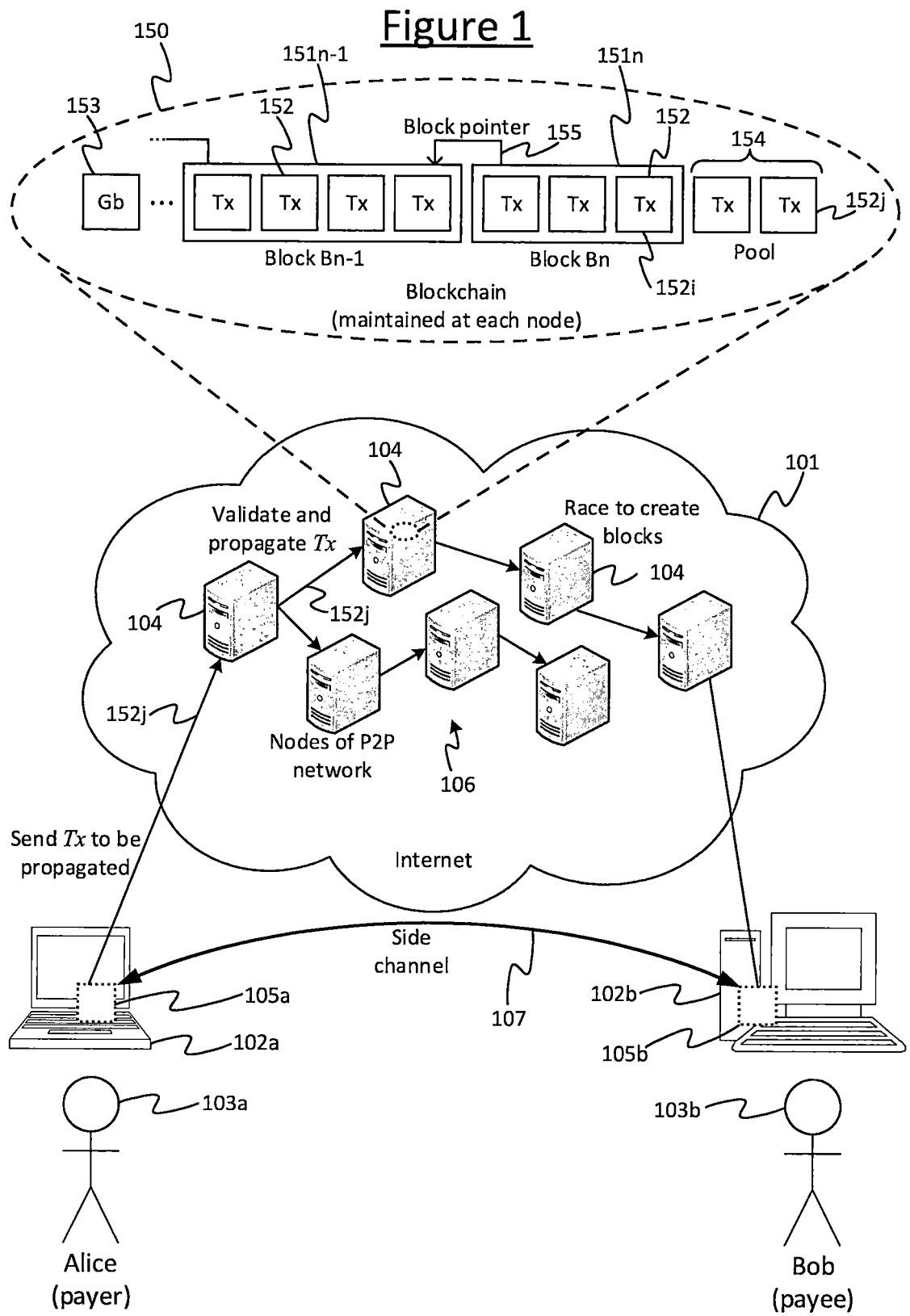
FIG. 1 is a schematic block diagram of a system for implementing a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the ordered set 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the input authorisation, for example the signature of the user 103a to whom the output of the preceding transaction 152i is locked. In turn, the output of the present transaction 152j can be cryptographically locked to a new user or entity 103b. The present transaction 152j can thus transfer the amount defined in the input of the preceding transaction 152i to the new user or entity 103b as defined in the output of the present transaction 152j. In some cases a transaction 152 may have multiple outputs to split the input amount between multiple users or entities (one of whom could be the original user or entity 103a in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152j (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152j could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152j matches the expected signature, which depends on the previous transaction 152i in an ordered sequence of transactions 152. In such an output-based transaction protocol, this may comprise checking that the cryptographic signature or other authorisation of the party 103 included in the input of the new transaction 152j matches a condition defined in the output of the preceding transaction 152i which the new transaction assigns, wherein this condition typically comprises at least checking that the cryptographic signature or other authorisation in the input of the new transaction 152j unlocks the output of the previous transaction 152i to which the input of the new transaction is linked to. The condition may be at least partially defined by a script included in the output of the preceding transaction 152i. Alternatively it could simply be fixed by the blockchain node protocol alone, or it could be due to a combination of these. Either way, if the new transaction 152j is valid, the blockchain node 104 forwards it to one or more other blockchain nodes 104 in the blockchain network 106. These other blockchain nodes 104 apply the same test according to the same blockchain node protocol, and so forward the new transaction 152j on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152j according to the blockchain node protocol. Another condition for a transaction to be valid is that the output of the preceding transaction 152i which it attempts to redeem has not already been redeemed by another transaction. Again if not valid, the transaction 152j will not be propagated (unless flagged as invalid and propagated for alerting) or recorded in the blockchain 150. This guards against double-spending whereby the transactor tries to assign the output of the same transaction more than once.

An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151n pointing back to the previously created block 151n–1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151n and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151n. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151n in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPU, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any blockchain node 104 that receives the transaction 152j will add the new validated transaction 152 to the ordered set of transactions 154 maintained at that blockchain node 104. Further, any blockchain node 104 that receives the transaction 152j will propagate the validated transaction 152 onward to one or more other blockchain nodes 104 in the network 106. Since each blockchain node 104 applies the same protocol, then assuming the transaction 152j is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-based Model

Figure 2:
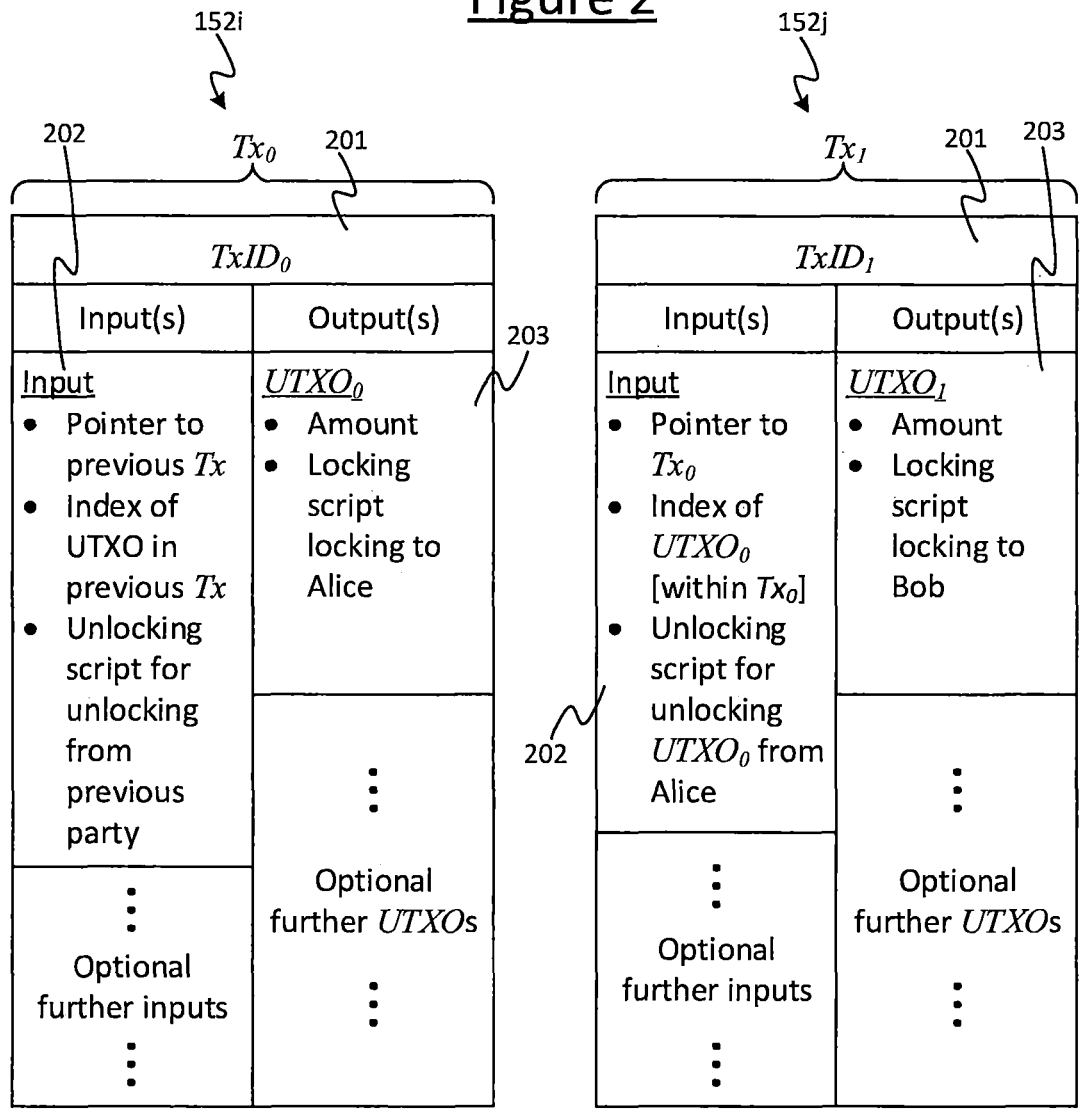
FIG. 2 schematically illustrates some examples of transactions which may be recorded in a blockchain.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after Tx if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition; typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig$P_A$><$P_A$>‖[Checksig$P_A$]

where "‖" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The message, m, is derived from specific details of the transaction being signed. Since this message must be identical from signing to verification, this process ensures that the transaction data included in the message cannot be modified without invalidating the signature.

As illustrated by FIG. 9, the message is generated by concatenating certain elements of the transaction information in a set order, as shown above. During verification of the signature, the message is not sent explicitly, but is instead recreated by the verifier based on the data in the broadcast transaction; the transaction information is concatenated via the same process used in signing, and double hashed to produce the message digest, e. If any part of the transaction that was used to recreate the message has been changed since the signature was produced, the message will not be identical, and verification will fail.

This process of using transaction details in the signature message provides an important element of security during the delay between the broadcast of a transaction and the point when it is published to the blockchain. However, since any element of the transaction that is 'signed' (i.e. included in the signature message) cannot be updated without invalidating the signature, some transaction fields can never be included in the signature message. These fields are the unlocking scripts for each input, which must be updated to include a signature after it is generated, and the transaction ID (TxID), which is the double hash of the full transaction (including signatures in the unlocking scripts). As both fields must contain (or are derived from) the signatures, they cannot be fixed until after the signatures have been produced.

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_. . ." refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The six different flag types allow a signature to selectively endorse, and therefore fix the details of, either all inputs and outputs, or various subsets. The different sets are illustrated below based on a signature that unlocks the input in index 2. The endorsed inputs and outputs are shown in bold.

| ALL | | |
|---|---|---|
| 0 | Input$_i$ | Output$_w$ |
| 1 | Input$_j$ | Output$_x$ |
| 2 | Input$_k$ | Output$_y$ |
| 3 | | Output$_z$ |

| NONE | | |
|---|---|---|
| 0 | Input$_i$ | Output$_w$ |
| 1 | Input$_j$ | Output$_x$ |
| 2 | Input$_k$ | Output$_y$ |
| 3 | | Output$_z$ |

| SINGLE | | |
|---|---|---|
| 0 | Input$_i$ | Output$_w$ |
| 1 | Input$_j$ | Output$_x$ |
| 2 | Input$_k$ | Output$_y$ |
| 3 | | Output$_z$ |

| ALL\|ACP | | |
|---|---|---|
| 0 | Input$_i$ | Output$_w$ |
| 1 | Input$_j$ | Output$_x$ |
| 2 | Input$_k$ | Output$_y$ |
| 3 | | Output$_z$ |

| NONE\|ACP | | |
|---|---|---|
| 0 | Input$_i$ | Output$_w$ |
| 1 | Input$_j$ | Output$_x$ |
| 2 | Input$_k$ | Output$_y$ |
| 3 | | Output$_z$ |

| SINGLE\|ACP | | |
|---|---|---|
| 0 | Input$_i$ | Output$_w$ |
| 1 | Input$_j$ | Output$_x$ |
| 2 | Input$_k$ | Output$_y$ |
| 3 | | Output$_z$ |

The flag names, shown at the top of each table, indicate which outputs—ALL, NONE or SINGLE—are included in the message. There are two variants of each flag and these signal which inputs are included in the signature message: the 'standard' variants (ALL, NONE, SINGLE; top row of tables in FIG. 2) include all inputs, while the 'anyone can pay' or ACP variants (ALL|ACP, NONE|ACP, SINGLE|ACP; bottom row) only include the input which the signature unlocks. For the single flag variants (SINGLE or SINGLE|ACP) note that the single output that is signed is always the one in the matching index position to the input being unlocked. The variants shown on the top row, those which sign all inputs, may also be referred to herein as ALL|ALL, NONE|ALL, and SINGLE|ALL respectively. As with the ACP variants, the first term indicates the outputs signed and the second term the inputs signed.

The fields in the message that are affected by the choice of sighash flag are Hash(Outpoints), Hash(nSeqs), Hash (Outputs) and the sigHashFlag field itself. When calculating the hash fields, inputs and outputs that are not included (based on the sighash flag) are emptied and the remaining data is concatenated in order and hashed. For example, for a sighash ALL|ACP signature, the information for inputs in index 0 (Outpoint$_i$) and index 1 (Outpoint$_j$) are removed, but the details of all outputs are retained, resulting in the following hash fields:

Hash(Outpoints)=Hash([TxID$_k$][index$_k$])

Hash($n$Seqs)=Hash([$n$Seq$_k$])

Hash(Outputs)=Hash([value$_w$][lockScriptLength$_w$]
[lockScript$_w$][value$_x$] . . . [lockScriptLength$_x$]
[lockScript$_x$][value$_y$][lockScriptLength$_y$] . . .
[lockScript$_y$][value$_z$][lockScriptLength$_z$][lockScript$_z$])

For a sighash SINGLE signature, all inputs are retained while only one output—that in index 2 matching the position of the signature—is kept, giving:

Hash(Outpoints)=Hash([TxID;][index;][TxID;][index;][TxID$_k$][index$_k$])

Hash($n$Seqs)=Hash([$n$Seq$_i$][$n$Seq$_j$][$n$Seq$_k$])

Hash(Outputs)=Hash([value$_y$][lockScriptLength$_y$]
[lockScript$_y$])

Other fields in the message string are not impacted by the sighash flag. The version and locktime fields (which are always included in the signature message) are identical for all signatures based upon the same transaction, regardless of which input the signature authorises. The remaining fields (outpoint$_k$, lockScriptLength$_k$, lockScript$_k$, value$_k$, and nSeq$_k$), relate directly to the input being signed, and so will change depending on which input the signature is created to unlock, but are not affected by the choice of sighash flag, since the input which is being unlocked must always be signed.

The signature message, along with the matching private key are passed to the ECDSA signature algorithm to produce a signature, (r, s). In order to include this signature in the Bitcoin transaction, it must be converted to a single string which is placed in the unlocking script field of the input it authorises. The string is created by concatenating the two elements of the signature, r and s, and encoding into byte format using the DER standard.

In the message, the sighash flag is appended as a final byte, with each sighash flag being represented by a specific value, as shown in the bale below, to give the serialised signature: sig(a,m)=[r][s][sigHashFlag]. Note that for an outpoint with a pay to public key hash (P2PKH) locking script, the signature is further appended with its associated public key before it is placed in the unlocking script field. During verification, for each signature in the transaction a message is recreated based on the transaction information and the sighash flag, and the signature is checked for validity with that message.

| Flag Name | Byte Value | Byte Value with Fork ID |
|---|---|---|
| ALL | 0x01 | 0x41 |
| NONE | 0x02 | 0x42 |
| SINGLE | 0x03 | 0x43 |
| ALL\|ACP | 0x81 | 0xC1 |
| NONE\|ACP | 0x82 | 0xC2 |
| SINGLE\|ACP | 0x83 | 0xC3 |

The six sighash flags offer the flexibility to 'sign' (by including in the signature message) anything from just one input (NONE\|ACP) to all inputs and outputs (ALL). For flags other than sighash ALL, this means that the transaction information that is excluded from the signature message can be changed without invalidating the signature. This allows more flexibility than the standard approach using sighash ALL. For instance, the anyone can pay flag variants do not place any restriction in the details of inputs other than the one which is being signed, which allows other parties to add inputs (i.e. 'pay') into the transaction without invalidating each other's signatures.

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Side Channel

As shown in FIG. 1, the client application on each of Alice and Bob's computer equipment 102a, 120b, respectively, may comprise additional communication functionality. This additional functionality enables Alice 103a to establish a separate side channel 107 with Bob 103b (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

Client Software

Figure 3A:
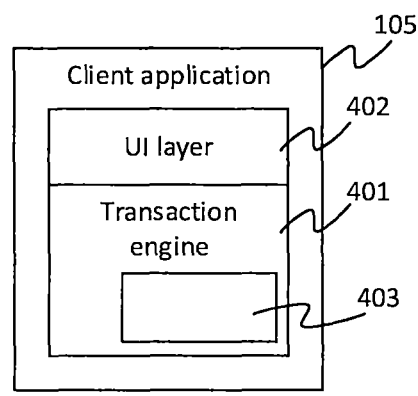
FIG. 3A is a schematic block diagram of a client application.

FIG. 3A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly. In accordance with embodiments disclosed herein, the transaction engine 401 of each client 105 comprises a function 403 which generates and modifies multisignature transactions.

The function 403 generates the multisignature transaction by providing, in a first index of the transaction, an input requiring multiple unlocking signatures and an output. A first signature is provided in the input which authorises only the output of the first index, i.e. the first signature is provided with a SINGLE|ALL or SINGLE|ACP sighash flag. The transaction at this stage, where more signatures are required to unlock the input of the first index, is referred to as a partial multisignature transaction.

The client application 105 transmits the partial multisignature transaction to client applications 105 associated with users who are authorised to unlock the input in the first index and/or add additional inputs and outputs to the transaction.

At a user device which has received the partial multisignature transaction, the function 403 can be used to provide another signature in the first index. This signature is provided with a SINGLE|ALL or SINGLE|ACP sighash flag if more signatures are required to unlock the input, or an ALL sighash flag if the signature is a final signature required, such that the signature authorises all outputs of the transaction. The function 403 also defines, in a second or next index an output or an input and an output, depending on the sighash flag which is used in the first index. In the case of an input and output being provided, the input comprises a signature with a single sighash flag. In the case that the final signature is provided to in the first index, the additional output must be provided before the signature is provided.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
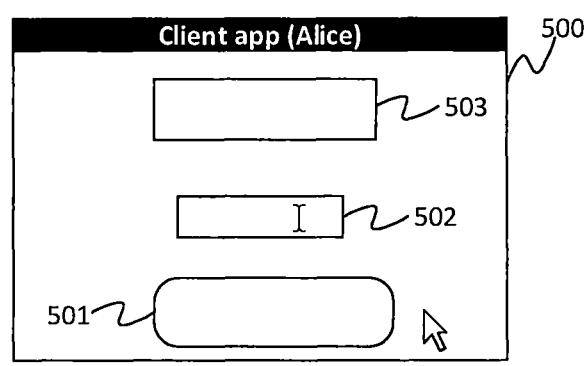
FIG. 3B is a schematic mock-up of an example user interface that may be presented by the client application of FIG. 3A.

FIG. 3B gives a mock-up of an example of the user interface (UI) 300 which may be rendered by the UI layer 402 of the client application 105a on Alice's equipment 102a. It will be appreciated that a similar UI may be rendered by the client 105b on Bob's equipment 102b, or that of any other party.

By way of illustration FIG. 3B shows the UI 300 from Alice's perspective. The UI 300 may comprise one or more UI elements 301, 302, 303 rendered as distinct UI elements via the user output means.

For example, the UI elements may comprise one or more user-selectable elements 301 which may be, such as different on-screen buttons, or different options in a menu, or such like. The user input means is arranged to enable the user 103 (in this case Alice 103a) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands). The options enable the user (Alice) to select a transaction to modify, select an outpoint or output for including in the multisignature transaction, generate a transaction, or provide a signature, for example.

Alternatively or additionally, the UI elements may comprise one or more data entry fields 302, through which the user can enter text to be included in an OP_RETURN, or provide a private key or password, for example. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 303 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 300 shown in FIG. 3 is only a schematized mock-up and in practice it may comprise one or more further UI elements, which for conciseness are not illustrated.

Node Software

Figure 4:
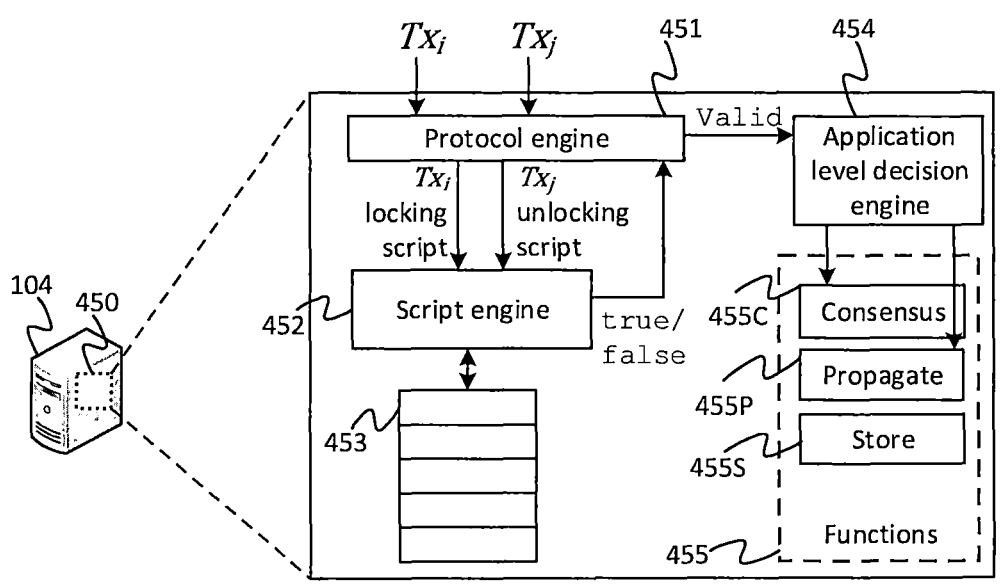
FIG. 4 is a schematic block diagram of some node software for processing transactions.

FIG. 4 illustrates an example of the node software 450 that is run on each blockchain node 104 of the network 106, in the example of a UTXO- or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152j ($Tx_j$) is received having an input pointing to an output (e.g. UTXO) of another, preceding transaction 152i ($Tx_{m-1}$), then the protocol engine 451 identifies the unlocking script in $Tx_j$ and passes it to the script engine 452. The protocol engine 451 also identifies and retrieves $Tx_i$ based on the pointer in the input of $Tx_j$. $Tx_i$ may be published on the blockchain 150, in which case the protocol engine may retrieve $Tx_i$ from a copy of a block 151 of the blockchain 150 stored at the node 104. Alternatively, $Tx_i$ may yet to have been published on the blockchain 150. In that case, the protocol engine 451 may retrieve $Tx_i$ from the ordered set 154 of unpublished transactions maintained by the node 104. Either way, the script engine 451 identifies the locking script in the referenced output of $Tx_i$ and passes this to the script engine 452.

The script engine 452 thus has the locking script of $Tx_i$ and the unlocking script from the corresponding input of $Tx_j$. For example, transactions labelled $Tx_0$ and $Tx_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of $Tx_j$ does not exceed the total amount pointed to by its inputs, and that the pointed-to output of $Tx_i$ has not already been spent by another valid transaction. The protocol engine 451 evaluates the result from the script engine 452 together with the one or more protocol-level conditions, and only if they are all true does it validate the transaction $Tx_j$. The protocol engine 451 outputs an indication of whether the transaction is valid to the application-level decision engine 454. Only on condition that $Tx_j$ is indeed validated, the decision engine 454 may select to control both of the consensus module 455C and the propagation module 455P to perform their respective blockchain-related function in respect of $Tx_j$. This comprises the consensus module 455C adding $Tx_j$ to the node's respective ordered set of transactions 154 for incorporating in a block 151, and the propagation module 455P forwarding $Tx_j$ to another blockchain node 104 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

Multisignature Transactions

One straightforward example of multiple signatures being used in a single transaction is when an input or output has a multi-signature (multisig) unlocking requirement. Typically, these are used to allow multiple parties to share control of an account or asset and require m-of-n signatures to authorise a spend, where m≤n.

A UTXO with a multisig unlocking requirement represents an asset that is controlled by more than one party, each of whom hold private signing keys. Typically, transactions using these multisig UTXOs as inputs would be drafted and pre-agreed privately between the authorised signing parties, and then each party would create a signature based on the full transaction. However, in some situations an output might relate specifically to one member of the group, who would want to have independent control of assigning it.

One example would be the dissolution of a joint account shared between two parties into two separate, singly-controlled accounts, for example during a divorce. A UTXO representing a joint savings account for Alice and Bob might have a 2-of-2 multisig unlocking requirement where Alice and Bob each hold a private signing key. If they wished to transfer these funds into two singly-controlled outputs, a transaction could be created and signed as follows:

1. Alice sets the multisig input in index 0, defines her output in index 0 and signs SINGLE. Since the multisig input and Alice's output are in the same index positions, this signature will endorse the input and fix Alice's output. Alice can safely send this to Bob even if trust is not ensured between them, since Bob cannot modify Alice's output without invalidating her signature and, consequently, the unlocking script for the multisig input. Similarly, since the second signature necessary to validate the input is not present, there is no danger that the transaction could be intercepted and the unassigned funds rerouted to an alternative address.

| Tx (NOT VALID) | | |
| --- | --- | --- |
| Inputs | | Outputs |
| Multisig 2-of-2 | <$Sig_A$: SINGLE> | $x_0$ BSV   Alice's Address |

2. Bob may now add his output in index 1 and sign the multisig input using sighash ALL. This supplies the necessary second signature to validate the input and fixes his output.

| Tx' (VALID) | | |
| --- | --- | --- |
| Inputs | | Outputs |
| Multisig 2-of-2 | <$Sig_A$: SINGLE> <$Sig_B$: ALL> | $x_0$ BSV   Alice's Address<br>$x_1$ BSV   Bob's Address |

This sequence of signing using different sighash flags allows Alice and Bob to avoid the mutual dependency that is inherent in all transactions that are signed sighash ALL. Neither Alice nor Bob has the opportunity to edit the other's output without invalidating the transaction. Equally, neither party can assign themselves more value than they ought to:

if Alice were to set her output value too high Bob would not sign to approve the transaction; if Bob were to set his output value higher than agreed, the value of the outputs would exceed that of the input and the transaction would be invalid.

In situations with a multisig involving more than two parties, for example a group of shareholders controlling a company account, a similar process can be implemented. For example, given an account with an n-of-n unlocking requirement, a shareholder could cash out their shares in the company in the following manner. The departing shareholder should set the company multisig as the input and allocate the funds they expect to be returned to their personal address in output 0. They should sign using a SINGLE flag as described in the previous example. The n−1 remaining shareholders are required to provide additional signatures to authorise the multisig input. They must also assign a second output that represents the value of their remaining shares, with a multisig spending requirement that does not include the leaving party (i.e. n−1-of-n−1). Each shareholder who agrees to the terms should sign the multisig in input 0 using a sighash ALL flag. This serves to fix their new multisig output and provides the n signatures required to validate the original multisig input. Situations are considered below in which more than one shareholder might wish to cash out simultaneously, for example if the company were to be fully dissolved.

The use of different sighash flags in the manner described here allows a form of dialogue to occur within the signing process, precluding the need for preliminary discussions in which the details of the transaction are laid out and agreed between parties in advance of signing. Although these formulations still require the cooperation of all parties who hold a key to the multisig UTXO, they provide a more streamlined signing process than the full pre-determination of all transaction information that is necessary when using sighash ALL flags.

However, with a single input it was not possible to sign more than two outputs independently. To achieve this, additional inputs can be placed in any index position to provide a placeholder for signatures, allowing outputs in any index position to be signed using a single flag variant. These inputs can reference any UTXO controlled by the party who wishes to control the matching output; the value of the input can be recouped by the party by increasing the value of the output they assign relative to the expected share of the input from the multisig account. Alternatively, the inputs could be 'tokens' (of nominal value) issued to parties explicitly for the purpose of acting as an input in these transactions. In the case of explicitly issuing tokens for this purpose, the token could be created so that its locking script includes an additional criterion that ensure that a specific sighash flag is used when the signature is generated, for example, to ensure that the token input will be signed using a SINGLE or SINLGE|ACP sighash flag. Tokens and the transactions in which they are used are described in more detail in the GB patent application entitled "Transaction Signature Flags" filed by the present applicant on the same day as the present application was filed, which is incorporated herein by reference.

An input that is used as a placeholder as described here (which should either have a nominal value or a value that is recouped by increasing the value of the paired output) will be referred to as a nominal input.

An additional factor that must be considered when multiple inputs occur in the same transaction is whether or not the inputs can be pre-defined or whether they must remain flexible. The former case requires that some details are arranged amongst parties before signing begins, but offers protection against malleability because it is not necessary to use the ACP flag variants. In contrast, the latter option allows the transaction to be signed and updated flexibly by each party, but means that additional measures may be necessary to protect against malleability.

Fixed Input Set

The use case of a group of company shareholders who have an n-of-n multisig account has been introduced above. A system which allows one shareholder to cash out their shares, leaving the remainder of the funds in an (n−1)-of-(n−1) multisig account controlled by the remaining shareholders has been provided. If, however, the shareholders instead decide to completely dissolve the multisig account, each party might want to independently set and sign their own output. To support this, nominal inputs can be included in addition to the multisig input so that outputs in later index positions can be signed singly. As will be shown in the example that follows, the parties who sign first and last do not need to provide an extra nominal input, but a nominal input must be included for each other signer.

For example, let Alice, Bob and Charlie be shareholders who hold keys for a 3-of-3 multisig account that they wish to dissolve. As the party who will sign in the middle of the chain, Bob must provide the details of his nominal input to the first party to sign (Alice). The signing process will proceed as follows:

1. Alice sets the pre-agreed inputs, defines her output in index 0 and signs Sig A using the SINGLE flag. Her signature endorses the multisig input and fixes her output, but allows other outputs to be added by Bob and Charlie.

| Tx (NOT VALID) | | |
|---|---|---|
| Inputs | | Outputs |
| Input$_0$ Multisig 3-of-3 | <Sig A: SINGLE> | x$_0$ BSV  Output$_0$ Alice's Address |
| Input$_1$ Bob | | |

2. Bob sets his output address in index 1. He must produce two signatures, Sig B_1 which endorses the multisig input in index 0 and Sig B_2, which is placed in index 1 and fixes Bob's output. Both signatures should use the sighash SINGLE flag, to allow Charlie to add his output at a later stage.

| Tx' (NOT VALID) | | |
|---|---|---|
| Inputs | | Outputs |
| Input$_0$ Multisig 3-of-3 | <Sig A: SINGLE> <Sig B$_1$: SINGLE> | x$_0$ BSV  Output$_0$ Alice's Address |
| Input$_1$ Bob | <Sig B$_2$: SINGLE> | x$_1$ BSV  Output$_1$ Bob's Address |

3. Charlie sets his output address in index 2. Since all inputs and outputs have now been defined, Charlie can sign using sighash ALL. This means he only needs to produce one signature, Sig C for the multisig input, as the ALL flag means it will fix his output without the need for a matching input. At this stage all inputs have received their required signatures and so the transaction is valid.

| Tx" (VALID) | | | |
|---|---|---|---|
| Inputs | | Outputs | |
| Input$_0$ | <Sig A: SINGLE> | x$_0$ BSV | Output$_0$ Alice's Address |
| Multisig 3-of-3 | <Sig B$_1$: SINGLE> <Sig C: ALL> | | |
| Input$_1$ Bob | <Sig B$_2$: SINGLE> | x$_1$ BSV x$_2$ BSV | Output$_1$ Bob's Address Output$_2$ Charlie's Address |

This scheme can easily be scaled to include more participants, with the first and last party following the steps for Alice and Charlie, respectively, and all other parties following Bob's steps. Although each party sets the value of their own output, it is not possible for anyone to take more than their agreed share. Participants who sign before the final stage of the scheme (i.e. Alice and Bob in this example) need subsequent signatures to be added in order to validate the spend of the multisig input—if they assign themselves extra, later parties will not agree to sign the transaction. The final party does not need any further signatures, but at this stage there is only the appropriate share of the value left unassigned—setting an output with a higher value would render the transaction invalid as there would not be sufficient input.

This scheme is able to offer independent control for each party to set and sign their outputs, and a streamlined signing process where the transaction is passed only once through each participant for signing. In spite of this, even parties who do not see the final version of the transaction can be sure that the process will be fair to them, since they are solely responsible for setting their own output.

Dynamic Inputs

In some situations it is not desirable (or possible) to pre-define all inputs before signing begins. For example, in contrast to the n-of-n multisig described in the previous section, for an m-of-n multisig (where m<n) there are many different subsets of signatures that can fulfil the multisig unlocking requirement. Since the set of nominal inputs that are included should, by design, represent the parties who will apply their signature to the multisig input, defining these in advance of the signing process would mean that only a specific set of m signatures would be valid. This restricts the flexibility that an m-of-n multisig is designed to incorporate. Thus, it might be preferable to use ACP sighash flags so that inputs can be set dynamically during signing based on which parties are available or choose to contribute a signature.

However, allowing this flexibility means that the order of signing becomes more important. In the situation described above for dissolving a company share account, the whole value contained within the multisig account was set to be assigned by the transaction, so parties who signed early in the chain only needed to ensure that they had been assigned their appropriate value. In contrast, for a transaction where inputs and outputs can be added dynamically, and where the multisig account is expected to retain the leftover funds, parties might not wish to sign early in the process as they forfeit the right to refuse outputs added by later parties.

It is also worth noting that parties signing in the middle of the chain, like Bob in the previous example, are required to provide two separate signatures. One of these (in the nominal input) serves to fix his personal output, while the other authorises the multisig input. If, based on Bob's position in the chain, these signatures are supplied before all the transaction inputs have been finalised, Bob must use the SINGLE|ACP sighash flag. If this is the case it becomes possible for a later party (Charlie) to remove the Bob's singly-signed input-output pair (which represents the transfer to Bob's account), while leaving Bob's signature for the multisig address intact. Having removed Bob's output, Charlie could then add the value that should have been assigned to Bob to Charlie's own output, in addition to his regular share. Since Charlie is the last to provide a signature, he is able to provide the final signature necessary to validate the spend of the multisig input, making the transaction valid.

Thus, parties who sign early in the chain are unable to approve spending that is added after they have signed, and are also vulnerable to their outputs being removed by parties later in the chain. One option to avoid this vulnerability is to ensure that mid-chain participants like Bob only provide one signature (that for their input-output pair) during the first round of singing, and that once the final party in the chain has signed (i.e. all inputs and outputs have been defined and a sighash ALL has been applied), the transaction should be re-circulated to all mid-chain parties for them to check that their output details have not been edited or removed, and if so provide their final signatures that are necessary to validate the spend of the multisig input.

A second option is to create an independent system (for example software) that is pre-programmed with the expected format of the multisig transaction at each stage, including the number of inputs and outputs, their values, the signature flags used, etc. This could be used to check after each stage of signing for several criteria, such as:

1. That none of the information from the previous iteration of the transaction had been removed or edited. This will prevent against attacks such as deletion of a SINGLE|ACP pair.
2. That signatures have been applied correctly. This could include full signature . . . verification such as ECDSA and/or a check that a specific sighash flag has been used so that subsequent stages of the signing process can proceed as planned.
3. If a pre-issued token is used as an input, that the token is valid for use in the present transaction (e.g. based on its outpoint, its value, a single-use code embedded within the OP_RETURN, etc.)
4. That the value of the outputs is appropriate. This should take into account any additional value contributed by new inputs added during the previous step.

In some embodiments, these checks are performed after the final signature has been provided and before transmitting to the blockchain.

If any one of the criteria checked at any stage of generating the multisignature transaction is not met, the multisignature transaction is not transmitted to the blockchain.

FIGS. 5 and 6 show example multisignature transactions 500, 600 which can be generated. Each transaction 500, 600 has a unique transaction ID. The term "multisignature transaction" is used herein to refer to a blockchain transaction comprising at least one input which identifies a UTXO with a multisignature unlocking requirement.

The multisignature transaction 500 of FIG. 5 is suitable for a scenario in which only two parties are required to authorise spending of the multisignature input, but the transaction includes an input associated with a third party, for example expenses of a junior member of the team.

The multisignature transaction 500 of FIG. 5 comprises three inputs and four outputs.

At index 0, there is a first input comprising a non-signature portion and a signature portion. The non-signature portion comprises an outpoint identifying a UTXO with a 2-of-n multisignature unlocking requirement. Two signatures have been provided in the signature portion: a signature provided by Alice (A$_0$) with a SINGLE|ACP sighash flag, and a signature provided by Bob (B) with an ALL sighash flag. Since Bob's signature signs all of the inputs and outputs of the transaction 500, it can only be provided after all of the inputs and outputs have been defined.

A first output is provided at index 0, comprising a UTXO corresponding to the remainder of the value of the input which has not been distributed to Alice, Bob, or the junior team member, and less the required transaction fee. This UTXO is locked to the n private keys of the authorising parties, and requires two of these parties to authorise spending, i.e. the UTXO has a multisig 2-of-n unlocking requirement. It will be appreciated that this output is only required if the value of the multisig input is not used up. In this scenario, it is important that the multisig output (if there is change) is placed in index 0, so that all parties who sign to authorise the spend of the multisig input (index 0) also sign the multisig output, even if they only use a SINGLE flag variant. If the multisig account were to be placed in a later index position, parties who sign early in the process will not sign the multisig output, so they could not be sure that the right amount of change was assigned; parties who sign later could assign themselves extra funds.

At index 1 of the transaction 500, there is an input comprising an outpoint identifying a UTXO already assigned to Alice and an unlocking script containing Alice's signature ($A_1$) with a SINGLE|ACP sighash flag. There is also an output at index 1 comprising a UTXO defined by Alice and locked to her public key. The output should have a value sufficient to cover Alice's expenses and the UTXO indicated in the outpoint of the input.

At index 2 of the transaction 500, there is an input comprising an outpoint identifying a UTXO already assigned to a junior member of Bob's team and an unlocking script containing a signature of the junior team member (B) with a SINGLE sighash flag, although a SINGLE|ACP sighash flag could also be used. There is also an output at index 2 comprising a UTXO to be assigned to the junior member and a locking script locking the UTXO to the junior member's public key. The UTXO is sufficient to cover the junior member's expenses and the UTXO indicated in the outpoint of the input.

The input-output pair is provided by Bob or the junior member of Bob's team after Alice has electronically singed the transaction. Alice, therefore, must use the ACP variation of the single sighash flag. If, alternatively, only Alice was able to include input-output pairs, for example if Alice has authority over all expenses of junior members, then Alice can provide her signature in index 0 with a SINGLE sighash flag since all inputs are known by Alice before she is required to provide her signature.

At index 3, there is no input, but there is a third output comprising a UTXO corresponding to Bob's expenses and a locking script locking the UTXO to Bob's public key. Bob can only provide his signature with the ALL sighash flag once all inputs and outputs in the transaction 500 have been provided.

The multisignature transaction 600 of FIG. 6 is suitable for a scenario in which three or more parties are required to authorise spending of the multisignature input. In the example shown, no other parties contribute, i.e. provide an input, to the transaction 600, although it will be appreciated that there may be additional inputs provided as in the expenses example set out above.

The multisignature transaction 600 of FIG. 6 comprises has three inputs and four outputs.

At index 0, there is a first input comprising a signature and a non-signature portion. The non-signature portion comprises an outpoint, $I_0$, identifying a UTXO with a 3-of-n multisignature unlocking requirement. Three signatures have been provided in the signature portion: a signature provided by Alice ($A_0$) with a SINGLE|ACP sighash flag, a first signature provided by Bob ($B_0$) with a SINGLEsighash flag, and a signature provided by Charlie (C) with an ALL sighash flag. Since Charlie's signature signs all of the inputs and outputs of the transaction 600, it can only be provided after all of the inputs and outputs have been defined.

A first output is provided at index 0 comprising a UTXO corresponding to the remainder of the value of the input which has not been distributed to Alice, Bob, and Charlie, or used to cover the transaction fee. This UTXO is locked to the n private keys of the authorising parties, and requires three of these parties to authorise spending, i.e. the UTXO has a multisig 3-of-n unlocking requirement. It will be appreciated that this output is only required if the value of the multisig input is not used up.

At index 1 of the transaction 600, there is a second input comprising an outpoint, $I_1$, identifying a UTXO already assigned to Alice and an unlocking script. The locking script comprises a second signature of Alice ($A_1$), which unlocks the UTXO indicated in the second input, with a SINGLE|ACP sighash flag. There is also a second output at index 1 comprising a UTXO to be assigned to Alice and a locking script locking the UTXO to Alice's public key. The UTXO is sufficient to cover Alice's expenses and the UTXO indicated in the outpoint of the second input.

At index 2 of the transaction 600, there is a third input comprising an outpoint, $I_2$, identifying a UTXO already assigned to Bob and an unlocking script. The locking script comprises a second signature of Bob ($B_1$), which unlocks the UTXO indicated in the second input, with a SINGLE sighash flag. There is also a second output at index 1 comprising a UTXO to be assigned to Bob and a locking script locking the UTXO to Bob's public key. The UTXO is sufficient to cover Bob's expenses and the UTXO indicated in the outpoint of the second input.

This input-output pair is provided by Bob after Alice has provided her signature at index 0. Alice, therefore, must use the ACP variation of the single sighash flag. If, alternatively, the outpoint in index 1 is already known prior to transaction generation, then Alice can provide her signature in index 0 with a SINGLE sighash flag since all inputs are known by Alice before she is required to provide her signature.

At index 3, there is no input, but there is a fourth output comprising a UTXO corresponding to Charlie's expenses and a locking script locking the UTXO to Charlie's public key.

Charlie can only provide his signature in index 0 with the ALL sighash flag once all inputs and outputs in the transaction 600 have been provided.

It is important to note here that theoretically Charlie could delete the input-output pairs in index 1 and 2 that correspond to Alice and Bob's expenses before he adds his output in index 3. Charlie can increase the value of the output he assigns to his own address so that he receives payment for all three sets of expenses. The signatures provided by Alice and Bob in index 0 to authorise the spend of the multisig account ($A_0$ and $B_0$) will remain in the transaction and so the multisig input signature requirement can be satisfied by Charlie adding his own signature.

Hierarchical Multisig

In some situations it might be beneficial to use the natural hierarchy that is created when all parties add their signatures in a single pass, where early signers do not have the opportunity to veto later parties' spending. This asymmetric structure could be suited to situations when parties do not have equal authority within the multisig account.

One example of this is a company current account that might be held to cover regular business expenses. The account might have an m-of-n multisig spending requirement, with each signatory holding a specific place in the hierarchy and the signing procedure. For example, let Alice, Bob and Charlie be senior managers with their own team of junior employees. Delilah is the company CFO. Alice, Bob, Charlie and Delilah all hold valid keys for the company's multisig current account. Though these parties are the primary signers, and will typically perform a role each month, four additional valid keys can be held amongst the senior finance team, who can act in place of the primary signatories if they are unavailable. This gives a multisig account which has a 4-of-8 unlocking requirement. There is a formal procedure for submitting expenses that starts with the most junior members.

1. Junior members in Alice, Bob and Charlie's teams must submit any personal expense claims by a set date each month based on the 'junior' transaction format shown below.

The expenses should take the form of a SINGLE|ACP-signed input-output, pair, with a nominal input The output should have a value equal (relative to the input value) to the employee's expense claim, and should be assigned to an address they own.

The precise details of the expenses could be referenced in the OP_RETURN of the output, for example by including a hash of the expense data.

$Tx_{Junior}$ (NOT VALID)

| Inputs | | | Outputs |
|---|---|---|---|
| Input$_0$ (dust) | <Sig J: SINGLE|ACP> | $x_0$ BSV | Output$_0$ OP_RETURN(hash(expense data)) |

2. Alice, Bob and Charlie collate the expenses submitted by their respective teams and perform the following steps to produce a transaction based on the 'manager' format below, which should be submitted to Delilah before a second deadline within the month.

Any expenses the manager does not approve are removed from the expenses set.

If a manager would like to submit their own expenses, or expenses incurred on behalf of the team, they can produce an additional SINGLE|ACP-signed input-output pair with a nominal input.

Every approved expense should be set in matched input-output positions within the transaction starting from index 1.

The manager should include the company multisig account in input 0. In order to avoid conflict between signatures produced independently by different multisig signatories, the output in index 0 should be predetermined.

e.g. if a company has an HD wallet they could define the private key for each successive month to be the next index in a specific range and generation of the key structure.

The value assigned to output 0 should only be a (pre-agreed) small amount; managers do not know what the final balance of the account will be after all expenses are added. Delilah will assign a second (larger) output to the new address once all expenses are known.

Managers should provide a SINGLE|ACP signature for the multisig input (and the pre-defined output) even if their team has not submitted any expenses that month.

$Tx_{Manager}$ (NOT VALID)

| Inputs | | | Outputs |
|---|---|---|---|
| Input$_0$ Multisig 4-of-8 | <Sig$_{Manager}$: SINGLE|ACP> | $\delta$ BSV | Output$_0$: Multisig 4-of-8 |
| Input$_1$ (dust) | <Sig J$_0$: SINGLE|ACP> | $x_1$ BSV | Output$_1$: J$_0$ Expenses |
| Input$_2$ (dust) | <Sig J$_1$: SINGLE|ACP> | $x_2$ BSV | Output$_2$: J$_1$ Expenses |
| Input$_3$ (dust) | <Sig$_{Manager}$: SINGLE|ACP> | $x_3$ BSV | Output$_3$: Manager Expenses |
| Input$_4$ (dust) | <Sig$_{Manager}$: SINGLE|ACP> | $x_4$ BSV | Output$_4$: Team Expenses |

3. Delilah will collate the manager transactions received from Alice, Bob and Charlie, and form a combined transaction that matches the company template below.

Delilah should combine the signatures from Alice Bob and Charlie for the multisig input.

All expenses from managers and team members are placed in matched input-output positions starting from index 1.

Delilah may add additional outputs without the need for additional nominal inputs, since she is the last to sign. These outputs might include her personal expenses and other company expenditure such as rent and utility bills.

Delilah should assign the remaining value from the multisig input to the pre-agreed multisig company account defined in a final output.

Finally, Delilah can produce the final signature necessary to authorise the multisig input and validate the transaction. For security, this must be signed using sighash ALL.

$Tx_{Company}$ (VALID)

| Inputs | | | Outputs |
|---|---|---|---|
| Input$_0$ Multisig 4-of-8 | <Sig$_{Alice}$: SINGLE|ACP><br><Sig$_{Bob}$: SINGLE |ACP><br><Sig$_{Charlie}$: SINGLE|ACP><br><Sig$_{Delilah}$: ALL> | $\delta$ BSV | Output$_0$: Multisig 4-of-8 |
| Input1 (dust) | <Sig J$_{A_0}$: SINGLE|ACP> | $x_1$ BSV | Output$_1$: J$_{A_0}$ Expenses |
| Input2 (dust) | <Sig J$_{A_1}$: SINGLE|ACP> | $x_2$ BSV | Output$_2$: J$_{A_1}$ Expenses |
| Input3 (dust) | <Sig$_{Alice}$: SINGLE|ACP> | $x_3$ BSV | Output$_3$: Alice Expenses |
| Input4 (dust) | <Sig$_{Alice}$: SINGLE|ACP> | $x_4$ BSV | Output$_4$: Alice Team Expenses |

Tx$_{Company}$ (VALID)

| Inputs | | | Outputs |
|---|---|---|---|
| Input5 (dust) | <Sig $J_{B_0}$: SINGLE\|ACP> | $x_5$ BSV | Output$_5$: $J_{B_0}$ Expenses |
| Input6 (dust) | <Sig$_{Bob}$: SINGLE\|ACP> | $x_6$ BSV | Output$_6$: Bob Team Expenses |
| | | $x_7$ BSV | Output$_7$: Delilah's Expenses |
| | | $x_8$ BSV | Output$_8$: Company Expense 1 |
| | | $x_9$ BSV | Output$_9$: Company Expense 2 |
| | | $x_{10}$ BSV | Output$_{10}$: Company Expense 3 |
| | | $x_{11}$ BSV | Output$_{11}$: Multisig 4-of-8 |

This setup also allows expenses from the whole company to be paid within a single transaction, and for the full company accounts to be represented each month on the blockchain, providing a succinct and immutable audit trail. This example makes use of the hierarchical structure that is inherent when combining SINGLE|ACP flags with a multisig input. Here, it allows managers to check and approve junior team members' expenses without the junior members needing to approve the manager's expense claims. Similarly, the CFO can check the expenses of juniors, managers and teams without, requiring any reciprocal checks.

Although the requirement that managers sign before the transaction is finalised removes their ability to veto expenditures from other managers or the CFO, including their signatures in the multisig requirement does provide a benefit: providing a signature each month means that they are bound to either submit their team's expenses or confirm there were none, which provides a level of accountability and helps ensure that expenses are not missed. It is worth noting that by requiring all managers to submit a signature for the multisig account each month, the system effectively operates as a 1-of-1 account that is fully controlled by the CFO. However, it would be straightforward to increase the requirements of the multisig account so that, for example, all three managers would sign, the CFO would finalise the transaction and sign, and a further two signatures were required from a set of five board members. This would mean that checks would be imposed on the CFO, which could be appropriate in certain situations. An alternative is that the final signature key is a threshold system, where a group of parties hold shares of the private key, and a subset of a certain number of group members are required to collaborate to produce a valid signature.

The signing process described here also provides a streamlined system: no group collaboration is necessary at any stage, since each party can produce their own independently functional transaction template; there is little restriction on the order of signing except that parties at each level have a deadline each month by which they need to act; all signatures are gathered within a single round of signing, without the need to backtrack; all information is communicated directly from one party to another, and communication can be unidirectional. These features mean that individuals retain a lot of freedom for when they submit their expenses (for instance, there is no set order for signing amongst peers), without restricting the momentum of the whole system. Additionally, the minimal communication requirement is particularly beneficial for large groups, where scheduling discussions can prove difficult.

This signing procedure provides a comprehensive example of how multiple sighash flags can be combined to effect sophisticated signing systems. In particular, the systems described here provide individuals the opportunity to collaborate on joint transactions without forgoing their independence. They also outline how exchanging partially-formed, partially-signed transactions can serve as communication in lieu of the preliminary dialogue that is necessary when signing sighash ALL, allowing for substantially more streamlined signing procedures.

Off-Chain and On-Chain Actions

Figure 7:
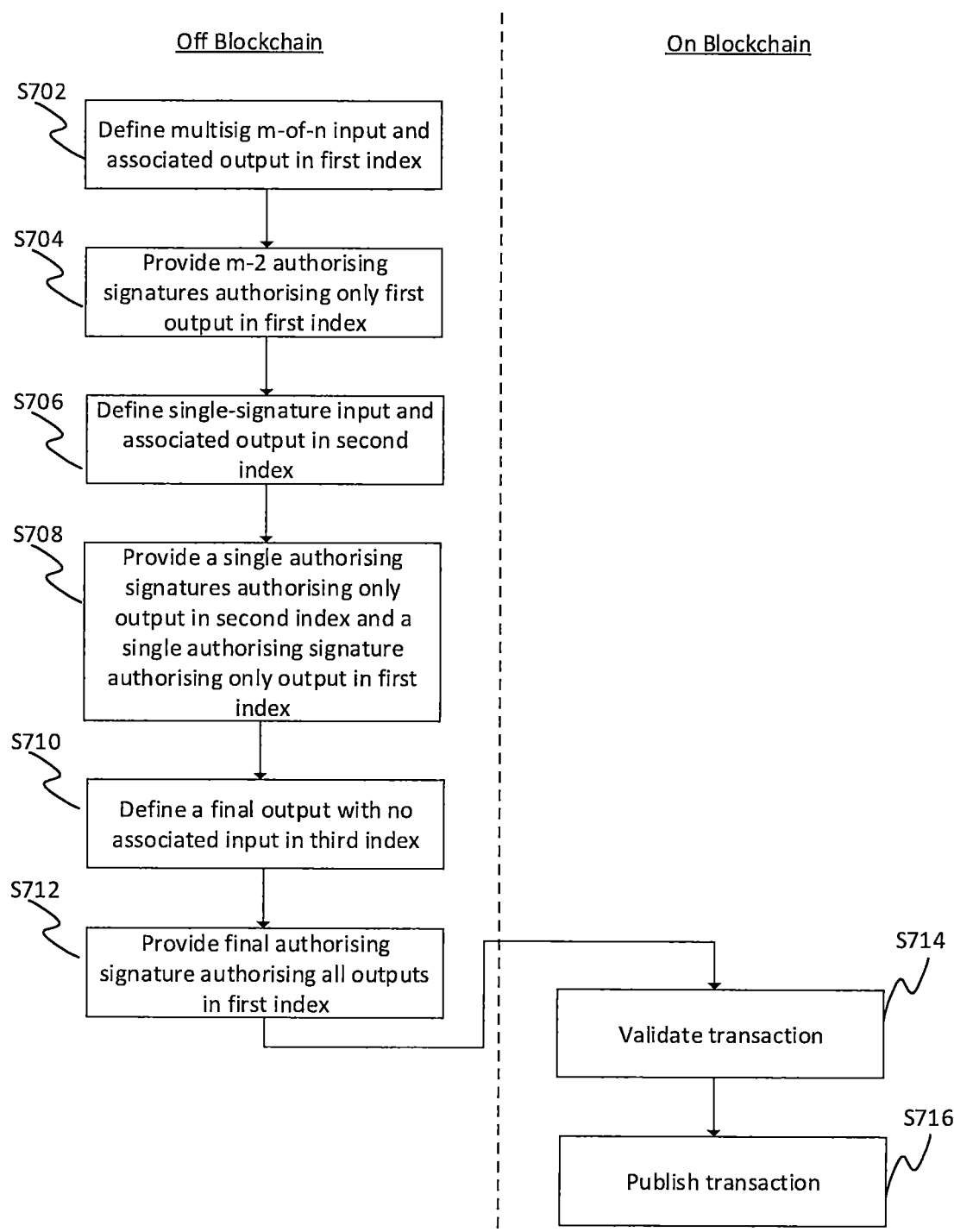
FIG. 7 is an example method of generating a multisignature transaction.

FIG. 7 shows an example method of generating a multi-signature transaction of the form shown in FIG. 6, where the inputs are not known in advance, i.e. a transaction with dynamic inputs. The method steps shown on the left-hand side are implemented off-chain by user devices of the participating parties, and the steps on the right-hand side are implemented on-chain by a blockchain node.

At step S702, the outpoint of the first input is defined, the UTXO indicated by which has a multisig unlocking requirement. The first output is also defined, which is a new multisignature address that has the same signature requirements as the UTXO in the first input. The value of the output should be equal to the value of the first input minus the expected values of the other outputs and the appropriate transaction fee.

At step S704, all of the required signatures for unlocking the UTXO indicated in the outpoint of the first input are provided at the first input, except those associated with parties to whom some of the UTXO of the first input is to be transferred. In the example of FIG. 7, there are two additional outputs and therefore m−2 signatures are provided at step S704. These signatures have a SINGLE|ACP sighash flag since the subsequent inputs have not yet been defined. If, however, all inputs have been defined prior to signing by any party, these signatures can have a SINGLE flag, since all input are already provided and can therefore be included in the message. These signatures provided at the first index sign only the output at index 0 and either only the input at index 0 (in the case of the SINGLE|ACP sighash flag) or all of the inputs of the transaction (in the case of the SINGLE sighash flag).

The outpoint of the second input is defined at step S706. This outpoint indicates a UTXO which has a single signature unlocking requirement and is controlled by the party who wishes to assign an output that they control independently. For example, the outpoint $I_1$ of FIG. 6, which is associated with a UTXO previously assigned to Alice, is the outpoint of the input-output pair in which an amount of the digital asset is assigned to Alice as an output.

The signature for unlocking the UTXO indicated by the outpoint in the second input is provided with a single sighash flag at step S708. Since all inputs are known, the sighash flag can be SINGLE, such that all inputs of the transaction are signed by the signature, or SINGLE|ACP, such that only the input at index 1 is signed. In either case, only the output at index 1 is signed. The use of SINGLE|ACP in a transaction with dynamic inputs is more versatile, even if the input-output pair is provided by a penultimate party singing the first input, to allow the final party to sign the option of splitting his share between multiple addresses, as may be the case if the final party needs to pay the expenses of a team member for example. The use of SINGLE|ACP also allows for the input-output pairs to be provided in any temporal order, which is advantageous if a central party is collecting the input-output pairs and compiling the multisignature transaction.

At step S708, the m−1$^{th}$ signature signatures for unlocking the UTXO indicated in the outpoint of the first input is provided at the first input. This signature is associated with the party providing the input-output pair at step S706.

At step S710, a final output is defined in index 2. This output does not have a corresponding input. The party responsible for providing the final output, who has not previously provided a signature for signing the multisignature UTXO, provides a final signature with an ALL sighash flag at the first input in index 0 to sign all of the inputs and all of the outputs of the transaction, step S712. No further alterations can be made to the transaction after the final signature has been provided.

The transaction is then transmitted to a blockchain node, which validates the transaction at step S714 by running the locking and unlocking scripts, as set out above. Once validated, the transaction is published to the blockchain, step S716.

It will be appreciated that the steps of the method as shown in FIG. 7 may be altered. For example, the step of defining the second input, step S706, may be performed before at least one of the m−2 signatures has been provide in the first input, that is, before at least one party that is not providing an output signs the first input. The step of providing signatures in the first input, step S704, may be performed in multiple steps, with each signature provided at an individual step. Some of these signatures may be provided before that for the second input and some after, depending on which party authorises the second input. The steps for providing signatures for the first input, step S708 may comprise two separate steps, and may be separated by additional steps for providing additional input-output pairs similar to steps S706 and S708.

Figure 8:
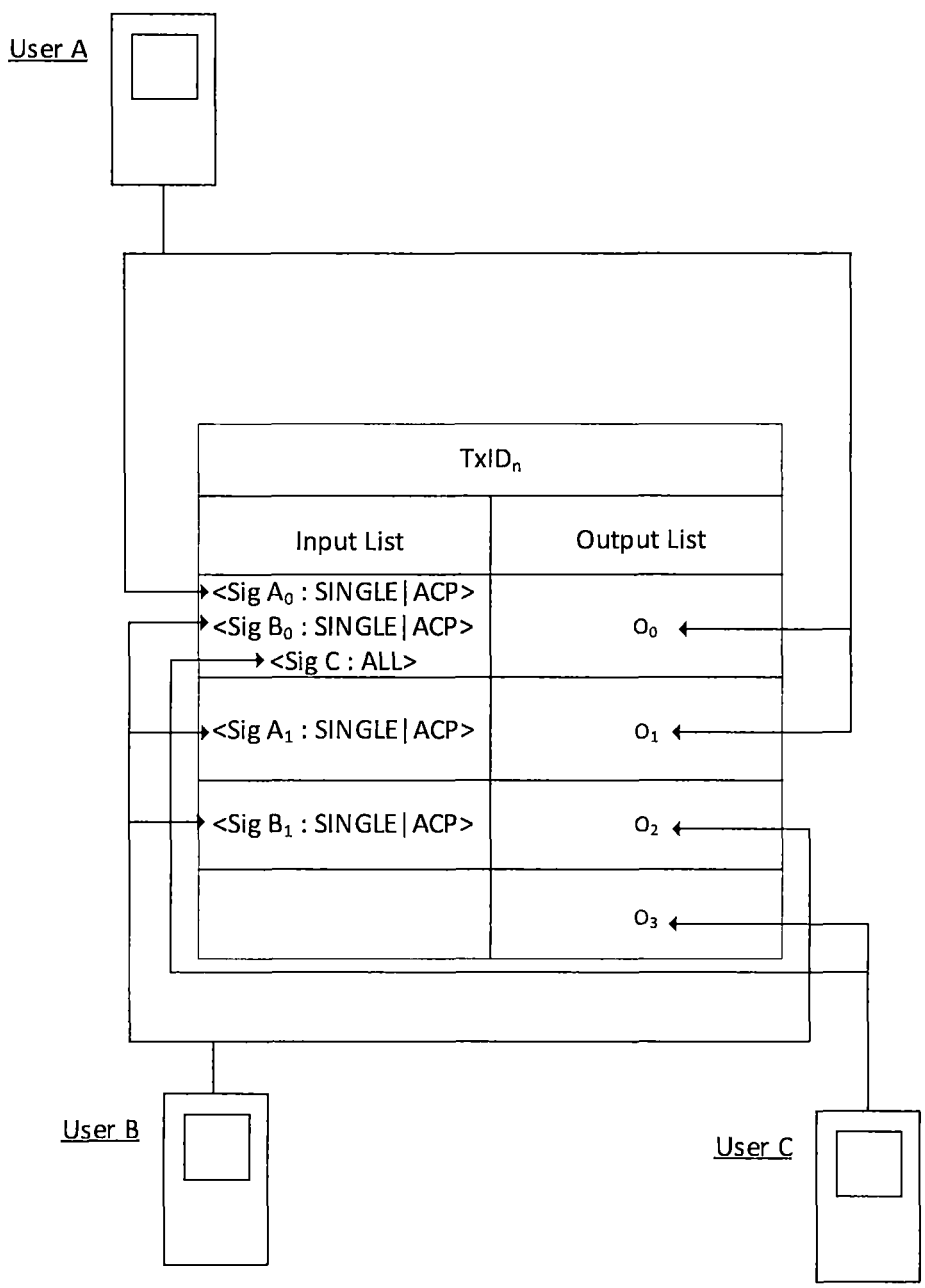
FIG. 8 is a schematic diagram of multiple user devices generating a multisignature transaction.

FIG. 8 shows an example system for generating the multisignature transaction 600.

The system comprises three user devices 802a, 802b, 802c, each operated by a party authorised to contribute to the transaction 600, and a blockchain node (not shown). Each user device 802a, 802b, 802c comprises a memory for storing a computer program and at least one processor on which the computer program is run. The computer program, when run, configures the processors to render the client application 300 for use by the party or user. The parties may be referred to as authorising parties as they authorise inputs and outputs of the transaction 600 by providing signatures.

The first output, first outpoint and first signature of first input of the transaction are defined at a first user device 802a by a first party (Alice) via the client application 300, which are included at index 0. The signature provided at the first input has a SINGLE|ACP flag as the inputs of the transaction are not known prior to signing. The first output is the remainder of the digital asset which is not assigned to any of the parties, nor used to pay the transaction fee, and is locked to multiple public keys.

Alice also defines at the first user device 802a an input-output pair for inclusion at index 1. This input-output pair comprises the second output defining the UTXO locked to Alice's public key, and the second input. Again, Alice signs with a SINGLE|ACP flag since not all inputs are known. If all inputs are known prior to Alice providing any signatures, she may use the SINGLE sighash flag at both index 0 and index 1.

The first user device 802a then transmits the partially completed transaction to a second user device 802b.

The second user device 802b is operated by a second party (Bob). The second party defines, via the client application 300 running on the second user device 802b, the third input and third output, which the user device 802b includes in index 2 of the transaction 600. The second user device 802b also provides a signature of the second party in the first input at index 0. Each signature provided by Bob has a SINGLE|ACP flag since he is not the final party to sign, so further inputs may be provided. However, if it is known that the final party to sing the transaction will not provide any further input, or said party is not authorised to provide any further inputs, then Bob can sign with a SINGLE flag. The partially complete transaction is then sent to the third user device 802c.

The third user device 802c is operated by a third party (Charlie). The third party defines, via the client application 300 running on the third user device 802c, the fourth outputs, which the user device 802c includes in index 3 of the transaction 600. The third user device 802c also provides a final signature of the third party in the first input at index 0 to authorise all inputs and outputs of the transaction 600.

Once the final signature has been included in the input, the transaction is valid. The third user device 802c transmits the now complete transaction 600 to the blockchain node for validating.

The system may include additional user devices operated by additional parties for contributing to the transaction 600. These parties may be authorised to sign the multisignature input (the first input) or they may only be authorised to provide input-output pairs for the transaction, which may be removed by a party authorised to sign the multisignature input.

The non-signature portion of the first input and first output may be provided by any party with the authority to sign the outpoint of the first input. This party is not required to also provide an input-output pair for transferring an amount of digital asset to itself. In the above example, Alice could define the first output and provide her signature at index 0, but if she does not need any of the digital asset herself, for example she has no expenses to be paid, she does not provide the input-output pair at index 1. At this point, the partially completed transaction is sent to the second user device 208b, where the input-output pair of Bob is provided at index 1.

In some embodiments, the whole of the UTXO referred to in the first input is to be transferred to individual parties, as in the case of dissolving a multisig account as described above. In such an embodiment, the output provided at index 0 by Alice comprises the amount of digital asset to be locked to Alice's public key. After Alice has defined the first input and first output, the partially completed transaction is sent to the second user device, at which Bob defines his input-output pair and includes this at index 1.

It may be advantageous to provide parties authorised to contribute to the transaction with a token which proves that the party is authorised to contribute. The token is a UTXO locked to the public key of the authorised party issued in a token issuing transaction. A party coordinating the transaction, in the above example this may be Delilah the CFO, generates the token issuing transaction.

| Tx$_{tokenissue}$ | | | |
|---|---|---|---|
| Inputs | | Outputs | |
| Outpoint$_0$ | <Sig$_{CFO}$: ALL> | x BSV | <signing condition> <P2PKH P$_{P1}$> |
| | | x BSV | <signing condition> <P2PKH P$_{P2}$> |
| | | ... | ... |
| | | x BSV | <signing condition> <P2PKH P$_{Pn}$> |
| | | y BSV | <P2PKH P$_{CFO}$> |

Each output of the token transaction may comprise a signing condition which defines a sighash flag which must be provided by the party when signing the token in the multisignature transaction, or when providing their input-output pair. The transaction will not be returned as valid if the sighash flag used when authorising the spending of the token does not match the sighash flag defined in the signing requirement.

The value of the token is small, such that the amount of digital asset lost by a token issuer if a token is not later used is negligible.

If a party defines an input which does not comprise a token, other than the multisignature input, the corresponding input-output pair can be removed by the CFO or a manager can refuse to include the expense in the transaction. Similarly, any token that is not valid for use in the present transaction can be removed. The computer device of the CFO which includes the final signature in the transaction, may check that the inputs are valid tokens before providing the final signature.

In the examples described above, the multisignature input has an m-of-n unlocking requirement, that is m out of the n signatures to which the UTXO is locked need to be provided to unlock the UTXO for spending. However, it will be appreciated that the above transactions may have inputs with n-of-n unlocking requirements, for which all n signatures to which the UTXO is locked are required for spending.

The UTXO provided in the second or subsequent indexes may have a multisignature unlocking requirement, rather than a single signature unlocking requirement as in the examples set out above. In this case, the non-signature portion of the input comprises the outpoint identifying the UTXO, and the signature portion comprises two or more signatures with single sighash flags for satisfying the multisignature requirement.

Although the above transactions are explained in the context of submitting expenses, it will be apricated that the multisignature transactions can be used in other scenarios in which at least one input has a multisignature unlocking requirement and parties can define their own outputs.

Transaction Fees

As discussed above, the transaction fee must be pair for the transaction. This fee can be provided in a number of ways.

The transaction fee can be entirely covered by the multisignature input. That is, the amount of digital asset in the output of the first index is equal to the multisignature input amount less all of the other outputs of the transaction assigned to other parties as well as the transaction fee.

The amount of transaction fee for any given transaction is calculated based on size of the transaction, that is, the number of inputs and outputs. Therefore, for transactions in which the number of inputs and outputs can vary, the transaction fee in not known at the time of providing the first output, such that the amount provisioned for the transaction fee may or may not entirely cover the fee. In this case, only an estimate of the fee is known at the time of providing the first output.

An amount larger than the estimate could be provisioned for the transaction fee, to ensure that the transaction fee is covered. However, this may result in an unnecessarily large transaction fee being paid.

Instead, one or more of the other inputs may be used to at least partially cover the transaction fee. Some example ways of covering the transaction fee using multiple inputs include:

Using an estimate to provision part of the multisignature input for the transaction fee, and after all of the input-output pairs and the final output have been provided, providing a transaction fee input of the required amount. This input can be signed with an NONE or ALL sighash flag.

Using an estimate to provision part of the multisignature input for the transaction fee, and after all of the input-output pairs and the final output have been provided, providing a transaction fee input-output pair, in which the input is larger than the required amount and the output is equal to the remainder of the input once the transaction fee has been paid. The output is returned to the party signing the transaction input. This input can be signed with any of SINGLE, SINGLE|ACP, and ALL sighash flag.

Not using any of the multisignature input for the transaction fee and using a transaction fee input or transaction fee input-output pair to cover the whole transaction fee. As above, these must be provided after all of the other inputs and outputs have been provided.

The multisignature input is used to cover part of the transaction fee for only the first index comprising the multisignature input and the final output. That is, the multisignature input covers the transaction fee associated with one input and two outputs. Each of the subsequent inputs are used to cover the transaction fee associated with their input-output pair, such that the amount of digital asset in the output for each input-output pair is equal to the input and the amount of the multisignature input assigned to the party signing said input, minus the transaction fee for the input-output pair.

It will be appreciated that the transaction fee may be paid using other combinations of the inputs of the multisignature transaction.

CONCLUSION

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer implemented method for generating a multisignature transaction for a blockchain, the method comprising: receiving a first output and a non-signature portion of a first input of a first input-output pair of the multisignature transaction, the first input comprising an outpoint to a first spendable transaction output encoding a multisignature requirement; electronically signing the first output and the non-signature portion of the first input of the first input-output pair, but not any other output of the multisignature transaction, with a private key corresponding to a public key of the multisignature requirement, thereby generating a signature for satisfying the multisignature requirement when included in a signature portion of the first input with: (i) an associated sighash single flag, and (ii) at least one other signature valid in respect of the multisignature requirement; receiving a second output and a non-signature portion of a second input of a second input-output pair of the multisignature transaction, the second input comprising an outpoint to a second spendable transaction output encoding a signature requirement requiring at least one signature; and electronically signing the second output and the non-signature portion of the second input of the second input-output pair of the multisignature transaction, but not any other output of the multisignature transaction, with a private key corresponding to a public key of the signature requirement, thereby generating a signature for at least partially satisfying the signature requirement when included in a signature portion of the second input with an associated sighash single flag.

Statement 2. The computer implemented method according to statement 1, wherein the method further comprises, after the second output and the non-signature portion of the second input of the second input-output pair of the multisignature transaction have been received: receiving a final output of the multisignature transaction with no associated input; and electronically signing all outputs and the non-signature portions of all inputs of the multisignature transaction with a final private key corresponding to a final public key of the multisignature requirement, thereby generating a final signature for satisfying the multisignature condition when included in the signature portion of the first input with (i) an associated sighash all flag, and (ii) at least the signature for satisfying the multisignature requirement.

Statement 3. The computer implemented method according to statement 2, wherein the method further comprises, after the final signature has been generated, transmitting the multisignature transaction to a blockchain node.

Statement 4. The computer implemented method according to any preceding statement, wherein if the signature requirement requires more than one signature, the method further comprises: electronically signing the second output and the non-signature portion of the second input of the second input-output pair of the multisignature transaction, but not any other output of the multisignature transaction, with another private key corresponding to another public key of the signature requirement, thereby generating another signature for partially satisfying the signature condition when including in a signature portion of the second input with an associated sighash single flag and the signature for at least partially satisfying the signature condition.

Statement 5. The computer implemented method according to any preceding statement, wherein the non-signature portion of the second input is received after at least one of the at least one other signature satisfying the multisignature requirement is received in the signature portion of the first input with a sighash single-anyone can pay flag, thereby signing only the first output and only the non-signature portion of the first input of the multisignature transaction.

Statement 6. The method according to any preceding statement, wherein an additional input is provided after the signature for at least partially satisfying the signature requirement, wherein the signature for at least partially satisfying the signature requirement is associated with a single-anyone can pay flag, thereby signing only the second output and the non-signature requirement of the second input of the multisignature transaction.

Statement 7. The method according to any preceding statement, wherein a portion of the first spendable output is assigned to a party signing the non-signature portion of the second input.

Statement 8. The method according to any preceding statement, wherein the second input of the multisignature transaction returns any remaining digital asset of the second spendable transaction output to a party signing the non-signature portion of the second input.

Statement 9. The method of any preceding statement, wherein an amount of digital asset defined in the second spendable transaction output is set based on a current transaction fee of a blockchain network maintaining the blockchain.

Statement 10. The method according to any preceding statement, wherein the method further comprises, after all outputs and all non-signature portions of the inputs have been provided, providing a non-signature portion of a transaction fee input for at least partially paying a current transaction fee of a blockchain network maintaining the blockchain, wherein the transaction fee input comprises an outpoint to a third spendable transaction output, an amount of digital asset defined in the third spendable transaction output being set based on the current transaction fee.

Statement 11. The method according to statement 10, wherein the amount of digital asset defined in the third spendable transaction output is greater than a portion of the transaction fee paid by the transaction fee input, the method further comprising providing a transaction fee output for reassigning a remainder of the third spendable transaction output to a party signing the non-signature portion of the transaction fee input.

Statement 12. The method according to statement 10, wherein the amount of digital asset defined in the third spendable transaction output is equal to a portion of the transaction fee paid by the transaction fee input, wherein the transaction fee input is not associated with an output.

Statement 13. The method of any preceding statement, wherein the second spendable-transaction output is a token assigned to a party signing the non-signature portion of the second input for authorising the party to participate in the multisignature transaction.

Statement 14. The method according to statement 13, wherein a locking script of the token defines a sighash flag which must be used to validly spend the token.

Statement 15. The method according to statement 3 or any statement dependent thereon, the method further comprising checking that a transaction criterion has been met, wherein the multisignature transaction is transmitted to the blockchain only if the criterion is met, wherein the criterion comprises at least one of: no information from a previous iteration of the multisignature transaction has been removed and/or changed; the signature provided is verified; a correct sighash flag is associated with the signature, wherein the correct signature allows subsequent stages of the method to be performed as required; a valid token is used; and the value of the outputs of the multisignature transaction is appropriate.

Statement 16. A computer system for generating a multisignature transaction for a blockchain, the computer system comprising one or more processors, wherein the processors are configured to: receive a first output and a non-signature portion of a first input of a first input-output pair of the multisignature transaction, the first input comprising an outpoint to a spendable output of a blockchain transaction encoding a multisignature requirement; electronically sign the first output and the first non-signature input of the first input-output pair, but not any other output of the multisignature transaction, with a private key corresponding to a public key of the multisignature requirement, thereby generating a signature for satisfying the multisignature requirement when included in a signature portion of the first input with: (i) an associated sighash single flag, and (ii) at least one other signature satisfying the multisignature requirement; receive a second output and a non-signature portion of a second input of a second input-output pair of the multisignature transaction, the second input comprising an outpoint to a spendable output of a blockchain transaction encoding a signature requirement requiring at least one signature; and electronically sign the second output and the non-signature portion of the second input of the second input-output pair of the multisignature transaction, but not any other output of the multisignature transaction, with a private key corresponding to a public key of the signature requirement, thereby generating a signature for at least partially satisfying the signature condition when including in a signature portion of the second input with an associated sighash single flag.

Statement 17. The computer system according to statement 16, wherein the one or more processors are further configured to after the second output and the non-signature portion of the second input of the second input-output pair of the multisignature transaction have been received: receive a final output of the multisignature transaction with no associated input; and electronically sign all outputs and the non-signature portion of all inputs of the multisignature transaction with a final private key corresponding to a final public key of the multisignature requirement, thereby generating a final signature for satisfying the multisignature condition when including in a signature portion of the first input with (i) an associated sighash all flag, and (ii) at least the signature for satisfying the multisignature requirement.

Statement 18. The computer system according to statement 17, wherein the computer system further comprises a blockchain node for validating blockchain transactions, wherein the one or more processors are configured to transmit the multisignature transaction to the blockchain node after the final signature has been generated.

Statement 19. The computer system according to any of statement 16 to 18, wherein if the signature requirement requires more than one signature, the system is further configured to: electronically sign the second output and the non-signature portion of the second input of the second input-output pair of the multisignature transaction, but not any other output of the multisignature transaction, with another private key corresponding to another public key of the signature requirement, thereby generating another signature for partially satisfying the signature condition when including in a signature portion of the second input with an associated sighash single flag and the signature for at least partially satisfying the signature condition.

Statement 20. The computer system according to any of statement 16 to 19, wherein the one or more processors are comprised in a single computer device.

Statement 21. The computer system according to statement 16, wherein the computer system is a first user device.

Statement 22. The computer system according to statement 21, wherein the computer system comprises a second user device configured to perform the method according to statement 2 or statement 3.

Statement 23. The computer system according to statement 21 or statement 22, wherein the computer system comprises a third user device configure to generate, before the non-signature portion of the second input is received, at least one of the at least one other signature satisfying the multisignature requirement for including in the signature portion of the first input with a sighash single-anyone can pay flag, thereby signing only the first output and only the non-signature portion of the first input of the multisignature transaction.

Statement 24. A computer program embodied on computer-readable storage and configured so as, when run on one or more processors, to perform any of the method of any of statements 1 to 15.

Statement 25. A multisignature transaction for a blockchain embedded on computer-readable media and comprising: a first output and a non-signature portion of a first input of a first input-output pair of the multisignature transaction, the first input comprising an outpoint to a first spendable transaction output encoding a multisignature requirement; a signature for satisfying the multisignature requirement when included in a signature portion of the first input with: (i) an associated sighash single flag, and (ii) at least one other signature valid in respect of the multisignature requirement, the signature for satisfying the multisignature requirement generated by electronically signing the first output and the non-signature portion of the first input of the first input-output pair, but not any other output of the multisignature transaction, with a private key corresponding to a public key of the multisignature requirement; a second output and a non-signature portion of a second input of a second input-output pair of the multisignature transaction, the second input comprising an outpoint to a second spendable transaction output encoding a signature requirement requiring at least one signature; and a signature for at least partially satisfying the signature requirement when included in a signature portion of the second input with an associated sighash single flag, the signature for at least partially satisfying the signature requirement generated by electronically signing the second output and the non-signature portion of the second input of the second input-output pair of the multisignature transaction, but not any other output of the multisignature transaction, with a private key corresponding to a public key of the signature requirement.

The invention claimed is:

1. A computer implemented method for generating a multisignature transaction for a blockchain, the method comprising:
receiving a first output and a non-signature portion of a first input of a first input-output pair of the multisignature transaction, the first input comprising an outpoint to a first spendable transaction output encoding a multisignature requirement;
electronically signing the first output and the non-signature portion of the first input of the first input-output pair, but not any other output of the multisignature transaction, with a private key corresponding to a public key of the multisignature requirement, to generate a signature for satisfying the multisignature requirement when included in a signature portion of the first input with: (i) an associated sighash single flag, and (ii) at least one other signature valid in respect of the multisignature requirement;
receiving a second output and a non-signature portion of a second input of a second input-output pair of the multisignature transaction, the second input comprising an outpoint to a second spendable transaction output encoding a signature requirement requiring at least one signature; and
electronically signing the second output and the non-signature portion of the second input of the second input-output pair of the multisignature transaction, but not any other output of the multisignature transaction, with a private key corresponding to a public key of the signature requirement, to generate a signature for at least partially satisfying the signature requirement when included in a signature portion of the second input with an associated sighash single flag.

2. The computer implemented method according to claim 1, wherein the method further comprises, after the second output and the non-signature portion of the second input of the second input-output pair of the multisignature transaction have been received:
receiving a final output of the multisignature transaction with no associated input; and
electronically signing all outputs and the non-signature portions of all inputs of the multisignature transaction with a final private key corresponding to a final public key of the multisignature requirement, to generate a final signature for satisfying the multisignature requirement when included in the signature portion of the first input with (i) an associated sighash all flag, and (ii) at least the signature for satisfying the multisignature requirement.

3. The computer implemented method according to claim 2, wherein the method further comprises, after the final signature has been generated, transmitting the multisignature transaction to a blockchain node.

4. The computer implemented method according to claim 1, wherein if the signature requirement requires more than one signature, the method further comprises:
electronically signing the second output and the non-signature portion of the second input of the second input-output pair of the multisignature transaction, but not any other output of the multisignature transaction, with another private key corresponding to another public key of the signature requirement, to generate another signature for partially satisfying the signature requirement when including in a signature portion of the second input with an associated sighash single flag and the signature for at least partially satisfying the signature requirement.

5. The computer implemented method according to claim 1, wherein the non-signature portion of the second input is received after at least one of the at least one other signature satisfying the multisignature requirement is received in the signature portion of the first input with a sighash single-anyone can pay flag, to sign only the first output and only the non-signature portion of the first input of the multisignature transaction.

6. The method according to claim 1, wherein an additional input is provided after the signature for at least partially satisfying the signature requirement, wherein the signature for at least partially satisfying the signature requirement is associated with a single-anyone can pay flag, to sign only the second output and the non-signature requirement of the second input of the multisignature transaction.

7. The method according to claim 1, wherein a portion of the first spendable output is assigned to a party signing the non-signature portion of the second input.

8. The method according to claim 1, wherein the second input of the multisignature transaction returns any remaining digital asset of the second spendable transaction output to a party signing the non-signature portion of the second input.

9. The method of claim 1, wherein the second spendable transaction output is a token assigned to a party signing the non-signature portion of the second input for authorising the party to participate in the multisignature transaction.

10. The method according to claim 9, wherein a locking script of the token defines a sighash flag which must be used to validly spend the token.

11. The method according to claim 3, the method further comprising checking that a transaction criterion has been met, wherein the multisignature transaction is transmitted to the blockchain only if the criterion is met, wherein the criterion comprises at least one of:
- no information from a previous iteration of the multisignature transaction has been removed and/or changed;
- the signature provided is verified;
- a correct sighash flag is associated with the signature, wherein the correct signature allows subsequent stages of the method to be performed as required;
- a valid token is used; and
- a value of the outputs of the multisignature transaction is appropriate.

12. A computer system for generating a multisignature transaction for a blockchain, the computer system comprising:
- memory comprising one or more memory units; and
- one or more processors, wherein the memory stores code which when run on the one or more processors causes the one or more processors to be configured to:
  - receive, at the processors, a first output and a non-signature portion of a first input of a first input-output pair of the multisignature transaction, the first input comprising an outpoint to a spendable output of a blockchain transaction encoding a multisignature requirement;
  - electronically sign, at the processors, the first output and the first non-signature input of the first input-output pair, but not any other output of the multisignature transaction, with a private key corresponding to a public key of the multisignature requirement, to generate a signature for satisfying the multisignature requirement when included in a signature portion of the first input with: (i) an associated sighash single flag, and (ii) at least one other signature satisfying the multisignature requirement;
  - receive, at the processors, a second output and a non-signature portion of a second input of a second input-output pair of the multisignature transaction, the second input comprising an outpoint to a spendable output of a blockchain transaction encoding a signature requirement requiring at least one signature; and
  - electronically sign, at the processors, the second output and the non-signature portion of the second input of the second input-output pair of the multisignature transaction, but not any other output of the multisignature transaction, with a private key corresponding to a public key of the signature requirement, to generate a signature for at least partially satisfying the signature requirement when including in a signature portion of the second input with an associated sighash single flag.

13. The computer system according to claim 12, wherein the one or more processors are further configured to after the second output and the non-signature portion of the second input of the second input-output pair of the multisignature transaction have been received:
- receive a final output of the multisignature transaction with no associated input; and
- electronically sign all outputs and the non-signature portion of all inputs of the multisignature transaction with a final private key corresponding to a final public key of the multisignature requirement, to generate a final signature for satisfying the multisignature requirement when including in a signature portion of the first input with (i) an associated sighash all flag, and (ii) at least the signature for satisfying the multisignature requirement.

14. The computer system according to claim 13, wherein the computer system further comprises a blockchain node for validating blockchain transactions, wherein the one or more processors are configured to transmit the multisignature transaction to the blockchain node after the final signature has been generated.

15. The computer system according to claim 12, wherein if the signature requirement requires more than one signature, the system is further configured to:
- electronically sign the second output and the non-signature portion of the second input of the second input-output pair of the multisignature transaction, but not any other output of the multisignature transaction, with another private key corresponding to another public key of the signature requirement, to generate another signature for partially satisfying the signature requirement when including in a signature portion of the second input with an associated sighash single flag and the signature for at least partially satisfying the signature requirement.

16. The computer system according to claim 12, wherein the one or more processors are comprised in a single computer device.

17. The computer system according to claim 12, wherein the computer system is a first user device.

18. The computer system according to claim 17, wherein the computer system comprises a second user device configured to modify the multisignature transaction for a blockchain by, after the second output and the non-signature portion of the second input of the second input-output pair of the multisignature transaction have been received:
- receiving a final output of the multisignature transaction with no associated input; and
- electronically signing all outputs and the non-signature portions of all inputs of the multisignature transaction with a final private key corresponding to a final public key of the multisignature requirement, to generate a final signature for satisfying the multisignature requirement when included in the signature portion of the first input with (i) an associated sighash all flag, and (ii) at least the signature for satisfying the multisignature requirement.

19. The computer system according to claim 17, wherein the computer system comprises a third user device configure to generate, before the non-signature portion of the second input is received, at least one of the at least one other signature satisfying the multisignature requirement for including in the signature portion of the first input with a sighash single-anyone can pay flag, to sign only the first output and only the non-signature portion of the first input of the multisignature transaction.

20. A computer program embodied on a non-transitory computer-readable storage media and configured so as, when run on one or more processors, the one or more processors perform a method for generating a multisignature transaction for a blockchain, the method comprising:
- receiving a first output and a non-signature portion of a first input of a first input-output pair of the multisignature transaction, the first input comprising an outpoint to a first spendable transaction output encoding a multisignature requirement;
- electronically signing the first output and the non-signature portion of the first input of the first input-output pair, but not any other output of the multisignature transaction, with a private key corresponding to a public key of the multisignature requirement, to generate a signature for satisfying the multisignature requirement when included in a signature portion of the first input with: (i) an associated sighash single flag, and (ii) at least one other signature valid in respect of the multisignature requirement;

receiving a second output and a non-signature portion of a second input of a second input-output pair of the multisignature transaction, the second input comprising an outpoint to a second spendable transaction output encoding a signature requirement requiring at least one signature; and electronically signing the second output and the non-signature portion of the second input of the second input-output pair of the multisignature transaction, but not any other output of the multisignature transaction, with a private key corresponding to a public key of the signature requirement, to generate a signature for at least partially satisfying the signature requirement when included in a signature portion of the second input with an associated sighash single flag.

* * * * *